US010835903B2

(12) United States Patent
Engelmann et al.

(10) Patent No.: US 10,835,903 B2
(45) Date of Patent: Nov. 17, 2020

(54) IN-LINE MILL ASSEMBLY WITH SPREADER RING

(71) Applicants: Dennis Engelmann, Germantown, WI (US); Stephen Bosshart, Milwaukee, WI (US); Eric Fleckten, Deerfield, IL (US); Harun Bilirgen, Bethlehem, PA (US); Robert LeDain, Plesant Praire, WI (US)

(72) Inventors: Dennis Engelmann, Germantown, WI (US); Stephen Bosshart, Milwaukee, WI (US); Eric Fleckten, Deerfield, IL (US); Harun Bilirgen, Bethlehem, PA (US); Robert LeDain, Plesant Praire, WI (US)

(73) Assignee: UCC Dry Sorbent Injection, LLC, Waukegan, IL (US)

( * ) Notice: Subject to any disclaimer, the term of this patent is extended or adjusted under 35 U.S.C. 154(b) by 749 days.

(21) Appl. No.: 15/268,921

(22) Filed: Sep. 19, 2016

(65) Prior Publication Data
US 2017/0001171 A1 Jan. 5, 2017

Related U.S. Application Data

(62) Division of application No. 14/723,224, filed on May 27, 2015, now Pat. No. 9,446,383, and a division of (Continued)

(51) Int. Cl.
*B02C 13/10* (2006.01)
*B02C 23/24* (2006.01)
(Continued)

(52) U.S. Cl.
CPC .......... *B02C 13/10* (2013.01); *B01J 20/28016* (2013.01); *B01J 20/3021* (2013.01); *B02C 13/286* (2013.01); *B02C 13/288* (2013.01); *B02C 23/00* (2013.01); *B02C 23/24* (2013.01); *B02C 2013/28681* (2013.01); *Y10T 137/0318* (2015.04)

(58) Field of Classification Search
CPC . B01J 20/3021; B01J 20/28016; B02C 19/00; B02C 19/0056; B02C 23/00; B02C 2013/28681; B02C 13/08; B02C 13/10; B02C 13/286; B02C 13/288; B02C 23/24; Y10T 137/0318
USPC .................. 241/55–57, 189.1, 188.1, 92
See application file for complete search history.

(56) References Cited

U.S. PATENT DOCUMENTS 4,191,338 A * 3/1980 Lyons ................. B02C 7/12
                                              241/245
5,263,653 A * 11/1993 Pallmann ............ B02C 13/08
                                              241/188.1

(Continued)

*Primary Examiner* — Adam J Eiseman
*Assistant Examiner* — Mohammed S. Alawadi
(74) *Attorney, Agent, or Firm* — Vitale, Vickrey, Niro, Solon & Gasey LLP (57) ABSTRACT

The system and method requiring a diverter plate for an in-line mill. The plate for use with the in-line mill includes an aperture for passage of particulate laden fluid therethrough and a plurality of tabs such that the fluid and the particulate entrained thereon is deflected at a variety of axial angles. The diverter plate thus provides a reliable method such that the milling process and component wear resistance is made more efficient thereby.

2 Claims, 7 Drawing Sheets

Related U.S. Application Data application No. 13/549,058, filed on Jul. 13, 2012, now Pat. No. 9,079,185.

(51) Int. Cl.

| | | |
|---|---|---|
| *B02C 13/286* | (2006.01) | |
| *B02C 13/288* | (2006.01) | |
| *B01J 20/28* | (2006.01) | |
| *B01J 20/30* | (2006.01) | |
| *B02C 23/00* | (2006.01) | |
| *B02C 19/00* | (2006.01) | |

(56) References Cited

U.S. PATENT DOCUMENTS

| | | | | |
|---|---|---|---|---|
| 5,419,499 A | * | 5/1995 | Bourne | B02C 13/06 |
| | | | | 241/18 |
| 6,431,477 B1 | * | 8/2002 | Pallmann | B02C 13/08 |
| | | | | 241/186.3 |
| 7,631,826 B2 | * | 12/2009 | Tamura | B02C 13/30 |
| | | | | 241/165.5 |
| 2013/0008514 A1 | * | 1/2013 | Enomura | B01F 3/0807 |
| | | | | 137/1 |

* cited by examiner

IN-LINE MILL ASSEMBLY WITH SPREADER RING

RELATED APPLICATION DATA

This application claims priority to utility patent application Ser. No. 14/723,224, filed May 27, 2015, now U.S. Pat. No. 9,446,383, which claims priority to application Ser. No. 13/549,058, filed on Jul. 13, 2012, now U.S. Pat. No. 9,079,185.

FIELD OF INVENTION

The present invention relates to a system and method for improving wear on the cutter blocks and related components of an in-line mill. Specifically, the present invention relates to an in-line mill for receiving and processing a particulate-laden pressurized fluid stream, wherein the assembly includes a diverter ring or plate. Preferably, the plate includes an aperture which is substantially orthogonal to the pressurized fluid flow and permits at least a portion of the pressured fluid to pass therethrough unabated. The plate further preferably includes multiple tabs or lobes extending radially outward from the plate aperture, with each tab having varying angles of deflection relative to the pressured fluid flow. The impact of the pressured fluid against the tabs creates a more varied deflection of any particulate entrained in the pressurized fluid, thus dispersing the wear of the cutter blocks and components of the in-line mill related to reducing the size of the particulate. Thus, a superior in-line mill assembly with improved durability in the reduction of particulate size in a pressurized fluid is disclosed.

BACKGROUND OF THE INVENTION

With the increase in environmental oversight, operators of power plants are pushing to discover new and better ways to remediate potential pollutants which are the byproducts of the power generation process. A variety of approaches have been developed for removal or mitigation of such byproducts resulting from coal fired power plants. One known approach is the use of dry sorbent injection (DSI) systems to reduce acid gas levels, such as sulfur dioxide ($SO_2$), sulfur trioxide ($SO_3$), sulfuric acid ($H_2SO_4$), and hydrochloric acid (HCl). DSI involves the addition of an alkaline material (such as sodium bicarbonate, hydrated lime, or trona) into various locations of the power plant system such that the acid gases react with the alkaline sorbents to form solid salts which are removed via a particulate control device.

While DSI is a cost effective control solution, it is not without its own processing challenges. For instance, certain sorbent materials are prone to clumping or agglomeration, while some sorbent materials (e.g., trona) are known to require milling in order to increase the surface area for reaction and to be more cost effective. For a variety of reasons (e.g., superior flow properties and predictability of particulate size), the use of on-site milling for certain sorbent particulate is preferred. One particularly effective method of on-site milling is the use of an in-line pneumatic milling system, which provides a superior reduction of $SO_2$ or $SO_3$ stack emissions when injecting trona or sodium bicarbonate. This approach, however, creates problems in that the consistent injection of the pressurized fluid in an inlet port can create concentrated and uneven wear or material buildup on the rotor and cutting surfaces of the mill. Such wear/buildup, in turn, can precipitate premature replacement or failure of the mill, as well as reducing the efficacy of the milling process, with the consequential degrading of the efficacy of the contaminant remediation process.

Thus, the present state of the art reflects a need for a system which reliably mills entrained particulate entrained in a pressurized fluid (such as sorbent particulate in a pneumatic conveyance system) in an inline mill configuration without creating undue wear or buildup on mill rotors and cutting surfaces, as such wear may increase maintenance costs and failure risks and decrease the efficacy of the system.

Description of the Prior Art

One example of a prior art approach is found in US 2009/0194618 A1 (Palin et al.), the teachings of which are incorporated herein by reference. That invention teaches an in-line system for milling sorbent material to be used in a pneumatic conveying system. Palin et al. provides for optimal particle size in a duct injection system, regardless of the original sorbent particle size, and is designed to prevent clogging of the milled material through the system. Such an approach, however, focuses on a system including a set of mills and related ductwork which facilitates bypass and cleaning conditions, among other events. Such a milling system, by definition, requires a series of in-line mills for a given fluid stream being treated, which may not be practical for certain power plant configurations. In addition, while Palin et al. teaches generally the use of in-line milling systems, it fails to address the problem of improving the efficacy of any one given mill. In short, while providing an improved system over the prior art, Palin et al. fails to suggest or teach how to prevent undue wear or buildup on the active surfaces of an in-line mill.

What is needed is simple, cost effective solution for the improved durability and milling of an in-line mill for receiving a particle-laden pressurized fluid.

Definition of Terms

The following terms are used in the claims of the patent as filed and are intended to have their broadest plain and ordinary meaning consistent with the requirements of the law.

An "in-line mill" means an in situ rotary tool for cutting, grinding or otherwise reducing particulate components which are located within a pressurized fluid stream.

A "plate" refers to a component for deflecting a least a portion of a particulate laden fluid stream for milling, the plate including an aperture which is generally orthogonal to the fluid stream flow such that at least a portion of the fluid stream may pass therethrough.

"Tabs" refers to plate components either integral to the plate or attachments which comprise two or more strips, lobes or other shaped segments which project at least radially from the plate aperture.

A "shaft and bearing assembly" refers to a support structure which is attached to (whether being integral to or connected to) a casing which supports a rotor of an in-line mill.

A "drive assembly" refers to a subsystem which provides force such that the rotors can cut, grind or reduce particulate from the fluid stream.

Where alternative meanings are possible, the broadest meaning is intended. All words used in the claims set forth below are intended to be used in the normal, customary usage of grammar and the English language.

OBJECTS AND SUMMARY OF THE INVENTION

The apparatus and method of the present invention generally includes an in-line mill system employing a diverter ring or plate for processing a pressurized particulate-laden fluid stream. The plate includes an aperture which is generally or approximately orthogonal to the fluid stream such that at least a portion of the fluid stream passes therethrough. The plate further includes a plurality of tabs projecting in various radial directions from the aperture, the tabs further projecting in various angles relative to the plane defined by the aperture. Thus, the tabs of the plate variably divert a portion of the fluid stream so as to disperse the fluid stream across a wider area of the cutting surfaces of the in-line mill. This dispersion of the particulate across such cutting surfaces reduces localized build up and/or wear on the cutting surfaces such that the efficacy and cost of the in line milling system is improved. The plate in the in-line mill may be mounted upon and supported by a variety of structures within the in-line mill including the rotor or a casing which enclosed the rotor, plate and reduction chamber of the mill. The casing is typically supported by a bearing and shaft assembly, and the rotor is powered by a drive assembly sufficient to mill, grind or otherwise reduce particulate within the fluid stream.

The immediate application of a present invention will be seen in processing sorbent and similar particulate for pollution control from operating plants, though those of skill will see that the present invention could be applied to other fields requiring a simple and robust solution for in-line mill systems processing particulate in a wide variety of fluid streams.

Thus can be seen that one object of the present invention is to provide a cost effective system for reducing build up and wear of in-line mills which process particulate entrained in a fluid stream.

A further object of the present invention is to provide a system and method for reducing localized wear and build up on cutting components of an in line mill processing particulate-laden fluid streams.

Still another object of the present invention is to provide a retrofit capable improvement to an in line mill for processing particulate-laden fluid streams.

Yet another object of the present invention is to provide for a system which provides more efficient and effective particulate milling from a pressurized fluid stream.

Still another object of the present invention is to provide a system and method for superior in situ sorbent processing in connection with the desulfurization of gas flue streams.

It should be noted that not every embodiment of the claimed invention will accomplish each of the objects of the invention set forth above. In addition, further objects of the invention will become apparent based on the summary of the invention, the detailed description of preferred embodiments, and as illustrated in the accompanying drawings. Such objects, features, and advantages of the present invention will become more apparent in light of the following detailed description of a best mode embodiment thereof, and as illustrated in the accompanying drawings.

BRIEF DESCRIPTION OF THE DRAWINGS

FIGS. 1*a* and 1*b* show a perspective front and rear views of an in-line mill employing a diverter plate in accord with a first embodiment of the present invention.

FIG. 2 shows a perspective view of a diverter plate in accord with a first embodiment of the present invention.

FIGS. 3*a* and 3*b* show example rotor and stator components, respectively on an in-line mill in accord with an embodiment of the present invention.

FIG. 4 is an exposed side view of the in-line mill components including the plate operating in conjunction with the rotor and stator components of the system. This view shows an example of how the plate tabs project in varying axial angles relative to the aperture.

FIG. 5 is a perspective view of another embodiment of the present invention showing multiple plates mounted to the inlet door of the in-line mill.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

FIGS. 1A and 1B shows a first preferred embodiment constructed in accordance with the present invention. The in-line mill 10 includes a casing 12 including a mill body 13 and a door 14 which is connected to the mill body by hinges 16.

Defined in door 14 is an inlet 18 which provides a means for introducing the particulate laden fluid stream for milling and subsequent passage through a discharge (not shown). Further mounted on the door 14 in this first preferred embodiment is a diverter plate 20, discussed in further detail below. The milling itself is provided by means of a circular rotor 30 surrounded by a concentric and closely operating stator 40, with both rotor 30 and stator 40 disposed within the mill body 13. One example of the components of such an in-line mill 10 is disclosed presently in the discussion of the applicant's VIPER Mill™, as disclosed at www.united-conveyor.com.

As shown in FIG. 2, the diverter plate 20 of a first embodiment of the present is shown. The plate 20 in this embodiment comprises an aperture 22 and a series of tabs 24, with several of the tabs 24 including bolt holes 26 for mounting to the door 14. The aperture can be a variety of shapes. In this embodiment, aperture 22 is generally a circular profile, though those of skill in the art will appreciate that the aperture may have an X or cross shape, or a different saw toothed or other configuration. The aperture is placed in line with the inlet 18 such that at least a portion of the fluid flow from the inlet 18 may pass through the aperture unabated. The remainder of the fluid flow is diverted or deflected on one or more of the tabs 24. The tabs 24 are bent or arced so as to be axially displaced from the plane define by the aperture 22. Most preferably, each of the tabs 24 have different angles relative to their neighboring tabs 24 such that the fluid is more widely scattered as it is diverted.

As shown in FIGS. 3A and 3B, the rotor 30 and stator 40 elements to which the fluid is diverted by tabs 24 provide for the milling or grinding of particulate within the fluid stream. The rotor 30 comprises front plate 32, rear plate 34, rotor blades 36 and a rotor hub 38 which is used to connect the hub to a drive shaft assembly (not shown) for rotation. The stator 40 includes a front ring 42, back ring 44, couplers 46 and cutter blocks 48. The rotor 30 and stator 40 operate in close proximity to one another such that the close proximity of the rotating rotor blades 36 and the stationary cutter blocks operate to cut or grind particulate entrained in the fluid stream. The variable diversion of particulate from the plate 20 provides a greater dispersion along the axial dimension of the rotor blades 36 and cutter blocks 48, thus providing for more even wear, less localized buildup of particulate and, ultimately, a more efficient desulfurization treatment process.

Figure 1A:
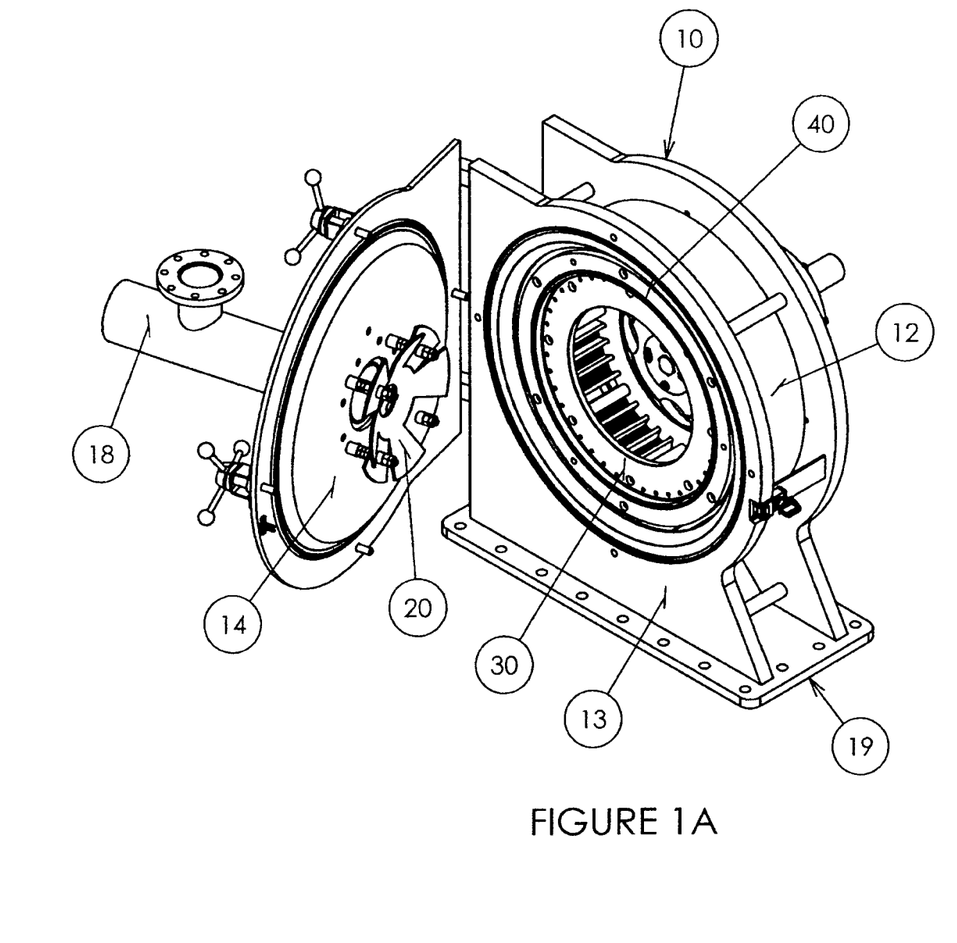
Figure 1B:
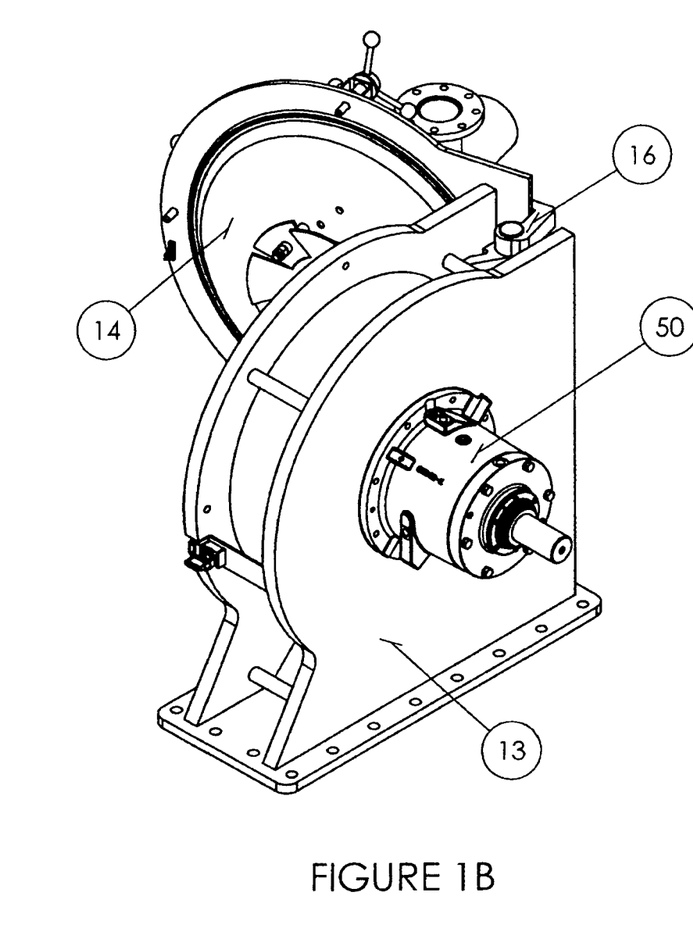
Figure 2:
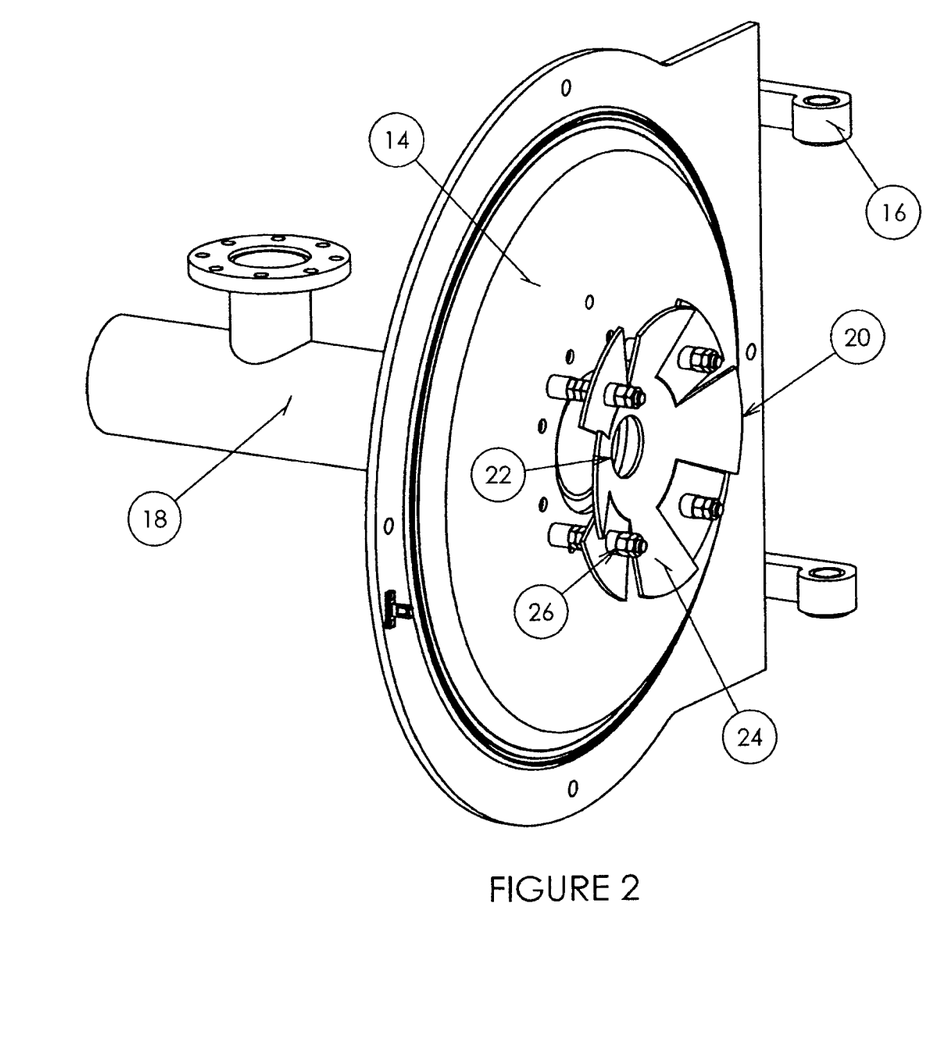
Figure 3A:
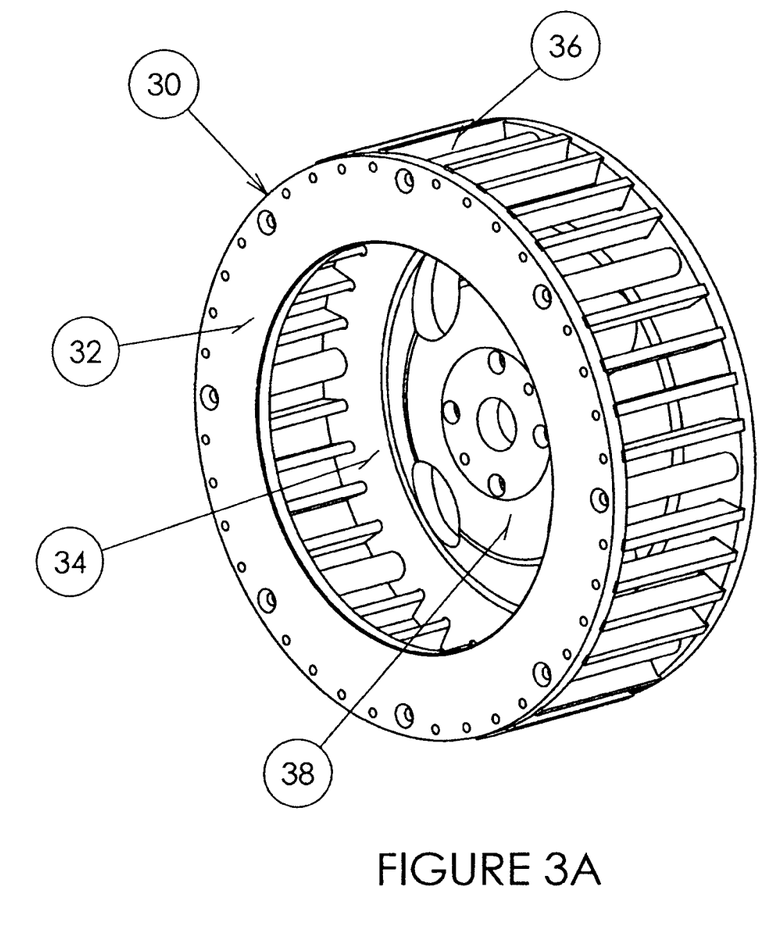
Figure 3B:
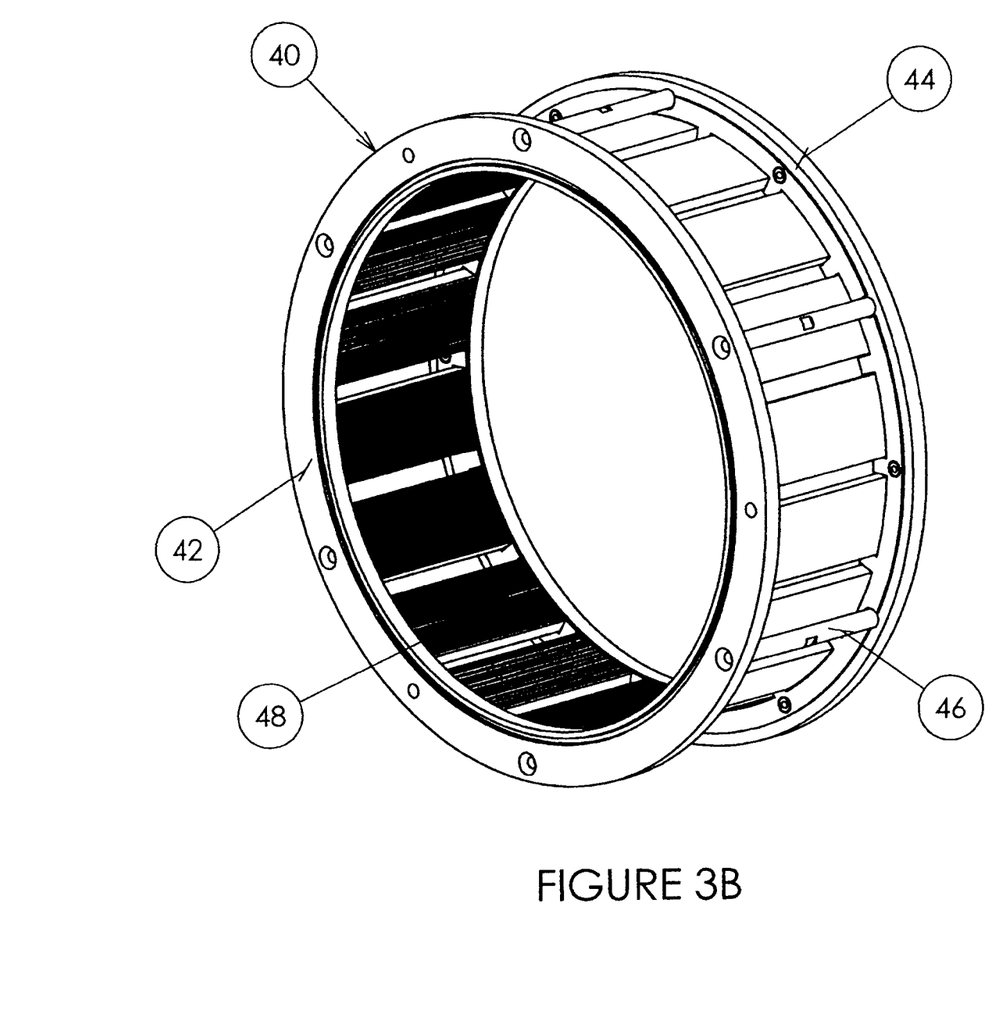
Figure 4:
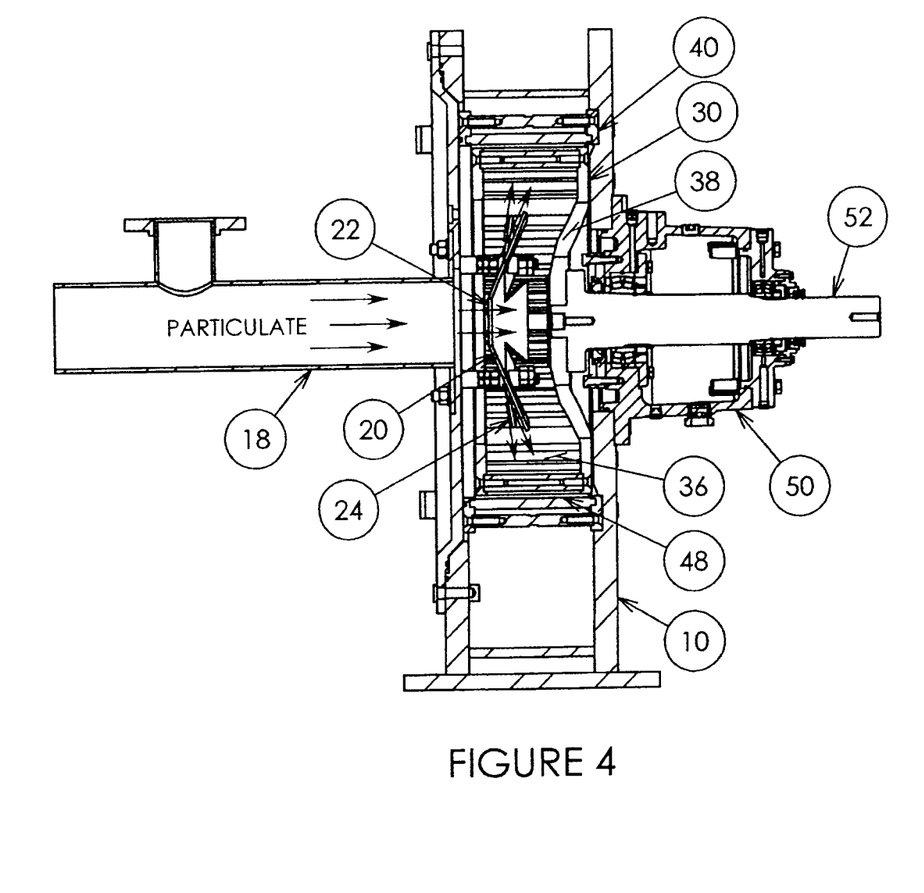

A side view of the mill 10 of this first embodiment of the present invention showing the through flow path of a particulate laden fluid stream is shown in FIG. 4. In this view, the pressurized fluid is shown being introduced to the mill 10 via the inlet 18. The first step in the fluid flow is contact with the plate 20. As is shown in this side view, the plate is coaxial with the rotor 30 and stator 40, and each of the tabs 24 have a slight curve or angle away from inlet 18. A portion of the fluid flow passes through the aperture 22, while the remainder is diverted by one or more of the tabs 24 such that the fluid—and any particulate entrained in the fluid—comes into operative communication with the rotor blades 36 and cutting surface 48. This view and the view of FIG. 1B shows generally a shaft and bearing assembly 50 including a shaft 52 which is displaced through the rotor hub 38. This shaft and bearing assembly is mounted to the casing opposite the inlet and provides support for the rotor 30, with the shaft being rotated by a motor (not shown) or other appropriate drive assembly to facilitate the milling process.

Figure 5:
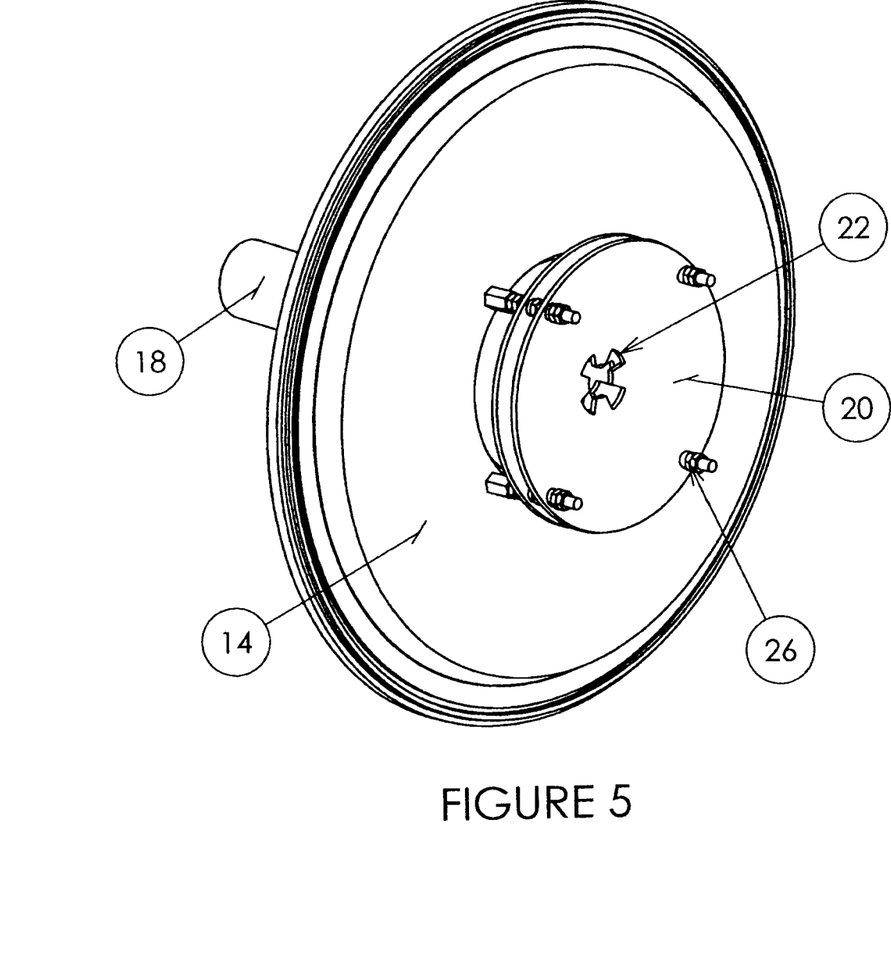

A variant or second preferred embodiment of the present invention using a different plate configuration is shown in FIG. 5. In this embodiment, the mill 10 includes two plates 20 which are both mounted on the door and axially displaced from one another. In this variant, still greater variable diversion of the fluid and its particulate may be achieved. Those of skill will also understand that the teachings of the present invention may extend in this embodiment to plates 20 which do not individually have but a single tab 24 comprising a curved or angled projection, but collectively in this embodiment plates 20 provide multiple tabs 24 so as to achieve the variable diversion providing the superior performance sought by the present invention.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the specific plate geometries of the preferred embodiments of present invention is for illustrative purposes with reference to the example drawings only. Similarly, while the preferred embodiments of the present invention are focused upon milling pressurized, sorbent laden gas fluid streams, those of skill will understand the applicability of the present invention to other fluids and particulate which require the superior milling provided by the present invention. Likewise, it will be appreciated by those skilled in the art that various changes, additions, omissions, and modifications can be made to the illustrated embodiments without departing from the spirit of the present invention. All such modifications and changes are intended to be covered by the following claims.

What is claimed is:

1. A method for increasing the variance of redirection in a particulate-laden pressured fluid stream comprising the steps of:
    a. Passing a portion of said pressurized fluid stream through an aperture centered upon a stationary, non-rotating plate;
    b. Redirecting a second portion of said pressurized fluid stream around a first tab of the stationary, non-rotating plate;
    c. Redirecting a third portion of said pressurized fluid stream around a second tab of the stationary, non-rotating plate, the first and second tabs being axially displaced from the aperture at a variety of angles so as to provide multiple angles of redirection for the portion of the particulate laden fluid stream redirected by the stationary, non-rotating plate.

2. The method of claim 1 wherein the first and second tabs are also defined along different radial angles from one another.

* * * * *